United States Patent Office 3,051,188
Patented Aug. 28, 1962

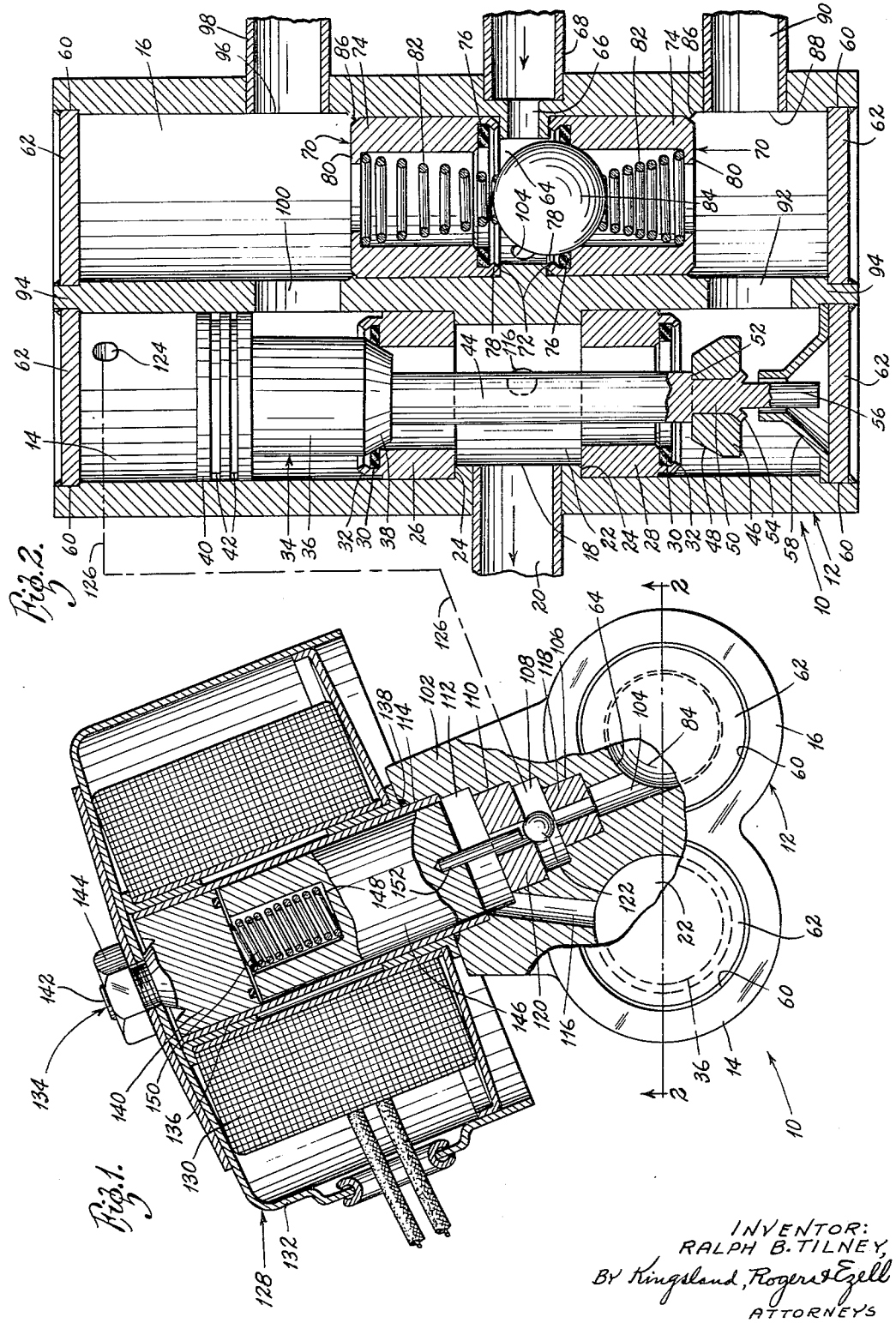

3,051,188
REVERSE CYCLE VALVE
Ralph B. Tilney, Clayton, Mo., assignor to Alco Valve Company, University City, Mo., a corporation of Missouri
Filed Mar. 14, 1955, Ser. No. 494,174
4 Claims. (Cl. 137—119)

The present invention relates to valves, and more particularly to a novel four-way valve for reverse cycle operation in closed fluid flow systems.

Briefly, the invention contemplates a novel four-way valve having a main inlet port, a main outlet port, and a pair of combination inlet-outlet ports, the arrangement being such that the main inlet port may be communicated directly with one, and the main outlet port with the other, of the combination ports and then operated so as to communicate the main outlet port with the one, and the main inlet port with the other, of the combination ports. The present valve is primarily intended for applications where a substantial pressure differential exists between the main inlet and the main outlet, this pressure difference being utilized, not only to maintain the valve in a selected condition of flow control, but also to effect changes from one condition to the other.

The four-way valve of the present invention comprises an arrangement including two different two-way valves, one of these two-way valves being adapted for direct actuation and the other being adapted for indirect or "slave" actuation following the direct actuation of the one valve. The direct actuation is preferably effected by means of a piston arrangement and a diverting valve for selectively communicating the piston cylinder either with the relatively high pressure maintained at the main inlet port or with the relatively low pressure maintained at the main outlet port.

It is apparent from the foregoing that the primary object of the present invention is to provide a novel four-way valve which is adapted to direct a pressure flow in a selected one of two directions and to receive a return flow from the other.

It is another object of the invention to provide a four-way valve which utilizes pressure differences existing therewithin for selectively maintaining a pressure seal between different fluid passage portions of the valve.

It is another object of the invention to provide a four-way valve which makes use of pressure differences existing therewithin for reversing a fluid flow condition.

It is another object of the invention to provide a four-way valve which comprises one two-way valve adapted for direct selective actuation and another two-way valve adapted for indirect or "slave" actuation.

The foregoing and additional objects and advantages will be apparent from the following description taken in conjunction with the accompanying drawings, in which:

FIGURE 1 is a top plan view, partly in section, showing a reverse cycle valve conforming to the teachings of the present invention; and FIGURE 2 is a sectional view taken generally along the line 2—2 of FIGURE 1.

Referring to the drawings more particularly through use of the reference numerals applied thereto, the numeral 10 indicates generally a reverse cycle valve constructed in conformance with the present invention. The valve 10 includes a main body 12, preferably of cast or forged metal, formed so as to define two parallel barrels 14 and 16.

Considering first the barrel 14, it will be noted from FIGURE 2 that a main outlet port 18 fitted with an outlet conduit 20 communicates with an outlet chamber 22 formed centrally of the length of the bore 14. As is clear from this figure, the chamber 22 defines a minimum diameter of the bore 14 whereby shoulders 24 are provided for seating abutment with valve sleeves 26 and 28 inserted from opposite ends of the bore 14 and pressed into place as illustrated. The sleeves 26 and 28 preferably take the shape clearly indicated in FIGURE 2 and each is provided with an annular seat 30 of resilient material retained by bent-over flanges 32 forming integral portions of the sleeves 26 and 28.

A valve assembly 34 is disposed for reciprocation in the bore 14. The assembly 34 includes a valve head 36 having a tapered portion 38 formed for seating engagement with the seat 30 disposed in the valve sleeve 26. The valve head 36 is extended upwardly a predetermined distance and is surmounted by a piston head 40 provided with conventional sealing grooves 42.

A valve stem 44, which may be integral with the valve head 36, extends downwardly therefrom through the valve sleeve 26, the outlet chamber 22, and the valve sleeve 28, below the latter of which it is fitted with a valve head 46 having a tapered portion 48 for seating engagement with the seat 30 disposed in the valve sleeve 28. The head 46 is fitted onto a reduced portion 50 and positioned against a shoulder 52, being then staked in place as indicated at 54. A still further reduced portion 56 of the valve stem 44 extends downwardly through a guide 58 retained in a counterbored portion 60 of the bore 14 by means of a closure plate 62 welded into place as shown.

It may be mentioned at this point that the opposite end of the bore 14, as well as both ends of the bore 16, are similarly counterbored so as to receive identical closing discs 62.

Directing attention now to the bore 16, it will be observed from FIGURE 2 that this bore also has a central portion of minimum diameter, which portion defines a main inlet chamber 64 provided with a main inlet port 66 in communication with an inlet conduit 68.

A pair of identical valve sleeve assemblies 70 are inserted from opposite ends of the bore 16 and are pressed into place against shoulders 72 formed at the upper and lower ends of the outlet chamber 64. These assemblies 70 include a sleeve-like cage 74 formed at one end to receive annular valve seats 76, these seats 76 being retained by inturned flanges 78 similar to the flanges 32 on the valve sleeves 26 and 28 aforementioned. At their ends opposite the flanges 78, the members 74 are provided with an inwardly extending flange 80 adapted to retain a compression spring 82 in the manner clearly illustrated in FIGURE 2 of the drawings. A ball valve 84 adapted for seating engagement with the seat 76 disposed in either of the sleeve assemblies 70 is interposed between the two compression springs 82. It will be understood that each of the springs 82 is under continuous compression and that they are so balanced as, in the absence of other forces, to position the ball valve 84 approximately midway between the seats 76. Preferably, the members 74 of the valve sleeve assembly 70 are staked into place as indicated at 86.

The portion of the barrel 16 below the sleeve assemblies 70 is communicated through a combination inlet-outlet port 88 with a conduit 90, and also through a cross port 92, formed in a common wall 94 between the barrels 14 and 16, with that portion of the barrel 14 below the valve sleeve 28. Similarly, the portion of the barrel 16 above the valve sleeve assemblies 70 is communicated through a combination inlet-outlet port 96 with a conduit 98, and also through a cross port 100, formed in the common wall 94, with that portion of the barrel 14 which is above the valve sleeve 26. In further connection with the location of the cross port 100, it will be noted from FIGURE 2 of the drawings that this cross port 100 communicates with that portion of the barrel 14 which is below the piston 40, the head portion 36 being sufficiently elongated to dispose the piston 40 above the cross port 100 even when the tapered portion 38 is seated against the seat 30 disposed in the valve sleeve 26.

The body 12 of the valve 10 includes a boss portion 102 located at the level of the chambers 22 and 64 and extending transversely in respect to the length of the body 12, as clearly illustrated in FIGURE 1 of the drawings. The boss 102 is provided with a main passage 104 which communicates at its inner end with the main inlet chamber 64. The passage 104 is counterbored so as to provide successive enlarged portions 106, 108, 110, 112 and 114. An offset passage 116 communicates the outlet chamber 22 with the portion 112 of the main longitudinal port 104.

A valve seat 118 is pressed into the portion 106 and a valve seat 120 is pressed into the portion 110, thereby defining a chamber in the open portion 108. A ball valve 122 is disposed in the open chamber portion 108 so as to be movable between the seats 118 and 120. Preferably, however, the size of the ball valve 122 is such that it will remain substantially on the center line of the longitudinal passage 104 and thus may be selectively seated against either of the seats 118 and 120.

A passage 124 communicates the chamber portion 108 of the passage 104 with that portion of the barrel 14 which is above the piston 40, and it will be understood that this passage 124 may be defined either wholly within a wall of the body 12 or by an external conduit. In other words, this intercommunication between different portions of a valve body is conventional, and is depicted schematically in the drawings by means of the broken line 126 extending between FIGURES 1 and 2.

The depicted embodiment of the four-way valve 10 includes an actuating solenoid assembly 128. The assembly 128 comprises a conventional solenoid coil 130 enclosed in the usual case 132, but disposed over a special core assembly 134. The core assembly 134 includes a tubular member 136 fitted into the recessed portion 114 of the passage 104 and secured therein as by welding 138. At its opposite end, the tubular member 136 is provided with a plug 140, pressed into place and having an extended threaded portion 142 fitted with a nut 144 for retaining the solenoid assembly 128 thereon. An armature 146 provided at one end with a spring well 148 in which is disposed a compression spring 150, and which is provided at the opposite end with a pin 152 extending coaxially therebeyond is disposed for reciprocation in an armature chamber defined by that portion within the tubular member 138 below the plug 140 and including also the portion 112 of the passage 104. By this arrangement, the pin 152 is adapted to force the ball valve 122 against the seat 118, which action is induced by the spring 150 in the absence of energization of the solenoid 130. Upon energization of the solenoid 130, however, the armature 146 is retracted against the spring 150 so as to withdraw the pin 152 from the ball 122 and allow the latter to seat against the seat 120.

*Operation*

The reversible four-way valve 10 is particularly adapted for use in reversible fluid flow systems such as those employing heat pump or refrigerating cycles. For example, a typical application may be assumed wherein the conduits 68 and 20 are connected into the pressure and suction sides, respectively, of a compressor handling a refrigerant fluid in a closed system. The conduits 90 and 98 would then be connected into opposite sides of the remainder of the fluid flow system, which would include the heat exchangers (functioning as condenser and evaporator), expansion valve, etc.

If it be now assumed that the solenoid coil 130 is energized so as to draw the armature 146 and its pin 152 upwardly away from the ball valve 122, the relatively high pressure which exists in the inlet chamber 64 will be established also in the extreme upper end of the barrel 14 above the piston 40. If it be further assumed that the valve assembly 34 and the ball valve 84 are in the position illustrated, pressure flow entering the inlet chamber 64 through the main inlet port 66 will pass upwardly through the upper sleeve-like spring cage assembly 70, and outwardly through the combination port 96. The fluid will return inwardly through the combination port 88 into the lower end of the barrel 16 and will flow through the cross passage 92 into the lower end of the barrel 14 and hence upwardly through the valve sleeve 28 into the outlet chamber 22 and on outwardly through the main outlet port 18.

Under the conditions above described, and as clearly illustrated in the drawings, it will be noted that high pressure is maintained not only above the piston 40 which is integral with the valve head 36, but also above the ball valve 84. Moreover, the reduced pressure which exists in the outlet chamber 22 is directly communicated with the underneath sides of both the head 36 and the ball valve 84. It is clear, therefore, that the pressure differential that exists between the main inlet chamber 64 and the main outlet chamber 22 acts upon the seated valve elements 36 and 84 so as to maintain the illustrated desired seated condition.

If it be now assumed that the solenoid coil 130 is de-energized, the spring 150 will act to drive the armature 146 and its pin 152 downwardly so as to force the ball valve 122 against the seat 118. Displacement of the ball 122 from the seat 120 serves to communicate the pressure chamber in the extreme upper end of the barrel 14 with the main outlet chamber 22. The resulting reduction in pressure exerted against the upper end of the piston 40 enables the high pressure which is still maintained on the annular underface of the piston 40 to displace the whole assembly 34 upwardly so as to open both valves 36 and 48, with the result that the upper end of the barrel 16 is suddenly communicated through the cross passage 100 and the valve sleeve 26 with the low pressure outlet chamber 22. Under these conditions, the pressure above and below the ball valve 84 tend to equalize so that the normal balanced action of the springs 82 causes the ball 84 to be centered between the seats 76. With the two valves in mid-position wherein the fluid flow is short-circuited from the inlet 68 to the outlet 20, there will nevertheless be a relatively high pressure condition acting upwardly on the annular portion of the piston 40 and on the underside of the valve 46, while there will be a relatively lower pressure acting above the piston 40 and above the valve 46. The reduced pressure results from pressure drop across the valves 38 and 48. The unbalanced condition just described then drives the piston upwardly, closing the valve 46 onto the seat 30.

Then, as the pressure at the lower end of the barrel 16 builds up due to the valve head being seated and as the pressure in the upper end of the barrel 16 is lowered due to the valve head 36 being unseated, the generally upward flow of fluid past the ball valve 84 and attendant pressure drop around the valve and the seat 76 causes this element to seat itself against the upper seat 76. It will be noted, once more, that with the valve head 46 and the ball valve 84 seated upwardly, the distribution of pressures within the barrels 14 and 16 is such as to maintain the established closed condition.

When once again it is desired to revert the valve 10 to the illustrated condition, the solenoid coil 130 is again energized so as to cut off communication between the extreme upper end of the barrel 14 with the outlet chamber 22 and establish communication of this piston chamber with the inlet chamber 64. The resulting high pressure established above the piston portion 40 causes the assembly 34 to be moved downwardly into the illustrated position, and this is followed by movement of the ball valve in reverse, as above described.

It will be noted that there is no mechanical connection between the valve assembly 34 and the movable ball valve 84. It will also be noted that, whereas the movements of the valve assembly 34 are directly instigated by the establishment of positive pressure differentials above and below the piston portion 40, movements of the ball valve 84 are induced by a combination of pressure differential and dynamic flow conditions which result from a change in position of the valve assembly 34. Thus, the action of the ball valve 84 follows in slave-like fashion the action of the valve assembly 34.

Clearly, there has been described a reverse cycle valve which fulfills the objects and advantages sought therefor.

It is to be understood that the foregoing description has been given by way of illustration and example, and that changes and rearrangement of parts, the substitution of equivalent elements, and the like, which will be obvious to those skilled in the art, are considered to be within the scope of the invention which is limited only by the claims which follow.

What is claimed is:

1. In a valve mechanism: a housing having a high pressure inlet and a low pressure outlet, and first and second working pipe outlets; flow constricting means between the inlet and the outlet to produce a fluid pressure drop in fluid flowing through the housing; first and second, opposed valve seats on opposite sides of the outlet; a valve means oppositely movable to cooperate with each valve seat, fluid pressure means including a movable wall connected to the valve means to move it in response to pressure conditions on opposite sides of the wall, the wall being exposed on the first side to fluid pressures upstream of the outlet and upstream of flow constricting means, and on the side of the first valve seat remote from the outlet, and means selectively to connect the second side of the wall to an area of higher pressure upstream of constricting means in the housing; and an area of lower pressure in the housing downstream of constricting means; the areas of the two sides of the movable wall, and the pressures to which they are subjected, being proportioned so that the valve means will be continuously urged in one direction when the second side of the wall is subjected to one of its aforesaid pressures, and continuously urged in the other direction when the second side of the wall is subjected to the other of its aforesaid pressures; and additional valve means movable to connect the inlet pressure to the first and second working lines selectively.

2. The valve mechanism of claim 1 wherein the additional valve means is in the housing upstream of the first side of the movable wall, and upstream of the two working lines; and is alternatively movable to connect the inlet to one working line and coordinately disconnect it from the other working line, and vice versa.

3. The valve of claim 2 wherein there is yieldable means normally urging the additional valve means to a mid position wherein it connects the inlet to both working lines.

4. The valve of claim 2 wherein the additional valve means includes opposed facing valve seats, a valve between them that can seat on either seat, and spring means connected to the ball to maintain it yieldably between the seats.

References Cited in the file of this patent

UNITED STATES PATENTS

| | | |
|---|---|---|
| 483,108 | Franke | Sept. 20, 1892 |
| 608,955 | Davey | Aug. 9, 1898 |
| 824,658 | Junggren | June 26, 1906 |
| 1,954,804 | Doble | Apr. 17, 1934 |
| 2,323,352 | Pitts | June 6, 1943 |
| 2,368,281 | Wittenberg | Jan. 30, 1945 |
| 2,390,425 | Crum | Dec. 4, 1945 |
| 2,486,608 | MacDougall | Nov. 1, 1949 |
| 2,613,908 | Palen | Oct. 14, 1952 |
| 2,638,123 | Vargo | May 12, 1953 |
| 2,678,063 | Ellis | May 11, 1954 |
| 2,693,930 | Carter | Nov. 9, 1954 |
| 2,714,394 | Moran | Aug. 2, 1955 |
| 2,754,840 | Hicks | July 17, 1956 |

OTHER REFERENCES

Product Engr'g Magzn, May 1953, pgs. 186–196. See pg. 189. (Copy available in Div. 39, U.S. Pat. Off.)